Patented Dec. 30, 1930

1,787,316

UNITED STATES PATENT OFFICE

HANS PAUL KAUFMANN, OF JENA, AND MAX SCHUBERT, OF FRANKFORT-ON-THE-MAIN-FECHENHEIM, GERMANY, ASSIGNORS TO I. G. FARBENINDUSTRIE AKTIEN-GESELLSCHAFT, OF FRANKFORT-ON-THE-MAIN, GERMANY, A CORPORATION OF GERMANY

NEW COMPOUNDS OF THE THIAZOLIC SERIES

No Drawing. Original application filed April 12, 1927, Serial No. 183,228, and in Germany April 15, 1926. Divided and this application filed August 23, 1929. Serial No. 388,028.

This application is a division of our application Serial No. 183,228, filed April 12, 1927.

Our invention relates to new compounds containing sulfur, having probably in their molecule a thiazol ring and corresponding to the general formula:

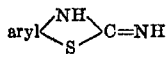

or its tautomeric form

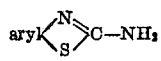

wherein aryl means an aromatic residue of the benzene, naphthalene, anthracene or anthraquinone series, which may contain further substituents, which products may be obtained by allowing a salt of sulfocyanic acid to act on primary arylamines, in which the para-position to the amino-group is either substituted by a monovalent radicle or blockaded (as f. i. in the case of β-naphthylamine), in the presence of a suitable halogen (Cl or Br) and preferably in an acidic medium.

The reaction runs probably in such a way, that in the first phase ortho-aminosulfocyanic compounds of the general formula:

are formed, which by the influence of the acidic medium or of the acid resulting from the reaction are converted into the isomeric aminothiazolic compounds, either in statu nascendi or after standing for some time or warming of the acidic reaction mass. By treating the separated ortho-aminosulfocyanic compounds with dilute acids or by heating them preferably higher than their melting point they are converted into the aminothiazolic compounds. The new thiazolic compounds are mostly crystalline bodies, having a definite melting point, they possess a basic character, but their amino-group is masked in most cases, as indicated by the aforesaid first formula for these compounds, because the new compounds yield in most cases, when diazotized in the usual manner, compounds having only a weak capacity for coupling with the usual azodyestuff components.

The new compounds are valuable intermediates for the production of dyestuffs and pharmaceutical products.

The following example will further illustrate our invention, but it is understood, that our invention is not limited to the particular proportions, reacting conditions or materials listed therein.

Example 9 parts of para-phenetidine are mixed with about 120 parts of 96% acetic acid and 18 parts of sodium sulfocyanide. Then a solution of 9 parts of bromine in 20 parts of acetic acid is slowly added at ordinary temperature. The product of reaction separates from the mixture in colorless crystals. It is filtered and washed with a solution of sodium carbonate and for purifying, it is redissolved in dilute hydrochloric acid and precipitated with a solution of a suitable alkali. The product of reaction shows, when recrystallized from dilute spirit, a melting point of 163° C. It corresponds probably to the formula:

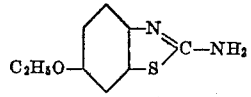

The new compound is quite soluble in hydrochloric acid and yields with nitrous acid a yellowish diazo compound, which couples with resorcinol to a red, with H-acid to a blue, with 2-naphthol-7-sulfonic acid to a reddish violet azodyestuff.

We claim:

As a new product a compound containing sulfur, having probably a thiazole ring in its molecule and corresponding probably to the formula:
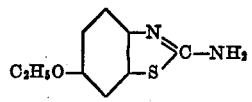
which is when dry a crystalline substance, melting at about 163°, when recrystallized from dilute spirit, and yielding a yellowish diazo compound.
In testimony whereof, we affix our signatures.
HANS PAUL KAUFMANN.
MAX SCHUBERT.